(12) United States Patent
Yamamoto et al.

(10) Patent No.: US 11,909,938 B2
(45) Date of Patent: Feb. 20, 2024

(54) PRINTING METHOD INCLUDING GRADATION REGION INK AMOUNT CALCULATION STEP

(71) Applicant: SEIKO EPSON CORPORATION, Tokyo (JP)

(72) Inventors: Yuko Yamamoto, Nagano (JP); Takahiro Kamada, Nagano (JP); Mitsuhiro Yamashita, Nagano (JP); Takuya Ono, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/317,125

(22) Filed: May 15, 2023

(65) Prior Publication Data

US 2023/0379421 A1    Nov. 23, 2023

(30) Foreign Application Priority Data

May 17, 2022  (JP) ................. 2022-080699

(51) Int. Cl.
*H04N 1/60* (2006.01)
*G01F 23/00* (2022.01)
*G01F 17/00* (2006.01)

(52) U.S. Cl.
CPC ........... *H04N 1/6027* (2013.01); *H04N 1/605* (2013.01)

(58) Field of Classification Search
None
See application file for complete search history.

(56) References Cited

U.S. PATENT DOCUMENTS

2006/0276978 A1* 12/2006 Yamamoto ........... B41J 2/17566
    702/55
2018/0295258 A1* 10/2018 Ochiai ................. H04N 1/6025

FOREIGN PATENT DOCUMENTS

JP    2006-334945 A    12/2006
JP    2011-029908 A    2/2011

* cited by examiner

*Primary Examiner* — Andrew H Lam
(74) *Attorney, Agent, or Firm* — Global IP Counselors, LLP

(57) ABSTRACT

A printing method includes: a color space conversion step; a gradation determination step of determining whether a pixel group forms a gradation; and a gradation region ink amount calculation step of calculating an ink amount of the pixel group determined to form the gradation. The gradation region ink amount calculation step includes an array information acquisition step of acquiring whether pixel values are arranged linearly, in a planar manner, or in a polyhedron manner in a uniform color space, a grating color value calculation step of determining a grating color value which is a color value of a grating point in the array, a grating ink amount calculation step of calculating, using the determined grating color value, a grating ink amount which is an ink amount of the grating point in the array, and an interpolation calculation step of calculating an ink amount of the pixel group determined to form the gradation by interpolation using the calculated grating ink amount.

5 Claims, 8 Drawing Sheets

FIG. 8

|  | L* | a* | b* |
|---|---|---|---|
| MINIMUM VALUE | 75 | 10 | 70 |
| MAXIMUM VALUE | 80 | 20 | 80 |

| L* | a* | b* | C | M | Y | K | Red | Orange | Green | LK |
|----|----|----|---|---|---|---|-----|--------|-------|-----|
| 75 | 10 | 70 | 0 | 0 | 255 | 0 | 0 | 13 | 0 | 12 |
| 75 | 10 | 80 | 0 | 0 | 255 | 0 | 0 | 12 | 0 | 5 |
| 75 | 20 | 70 | 0 | 0 | 255 | 0 | 0 | 28 | 0 | 8 |
| 75 | 20 | 80 | 0 | 0 | 255 | 0 | 0 | 24 | 0 | 2 |
| 80 | 10 | 70 | 0 | 0 | 255 | 0 | 0 | 5 | 0 | 6 |
| 80 | 10 | 80 | 0 | 0 | 255 | 0 | 0 | 12 | 0 | 3 |
| 80 | 20 | 70 | 0 | 0 | 250 | 0 | 0 | 9 | 0 | 0 |
| 80 | 20 | 80 | 0 | 0 | 255 | 0 | 0 | 22 | 0 | 0 |

TB2

PRINTING METHOD INCLUDING GRADATION REGION INK AMOUNT CALCULATION STEP

The present application is based on, and claims priority from JP Application Serial Number 2022-080699, filed May 17, 2022, the disclosure of which is hereby incorporated by reference herein in its entirety.

BACKGROUND

1. Technical Field

The present disclosure relates to a printing method.

2. Related Art

There is known an ink amount determination device that acquires an evaluation index including a first evaluation index for evaluating a color difference between a color value of an identified color and a color value of an ink amount and a second evaluation index for evaluating a color difference between color values obtained under a plurality of observation conditions for the ink amount, in order to implement reliable color reproduction under a reference light source and match colors as much as possible under multiple light sources (for example, JP-A-2006-334945). The ink amount determination device associates ink amount data whose evaluation index obtained satisfies a predetermined evaluation criterion with specified color data.

In the related art, when an ink amount for reproducing a color value is determined, a part of the color value having a gradation may not be sufficiently reproduced.

SUMMARY

According to an aspect of the present disclosure, a printing method is provided. The printing method includes: a color space conversion step of converting a color space of image data from a device-dependent color space to a uniform color space; a gradation determination step of determining, using a distribution of a pixel group and a color change included in a predetermined range from a pixel of interest in the converted uniform color space, whether the pixel group forms a gradation; and a gradation region ink amount calculation step of calculating an ink amount of the pixel group determined to form the gradation, in which the gradation region ink amount calculation step includes an array information acquisition step of acquiring whether pixel values constituting the pixel group determined to form the gradation are arranged linearly, in a planar manner, or in a polyhedron manner in the uniform color space, a grating color value calculation step of determining a grating color value which is a color value of a grating point in the array, a grating ink amount calculation step of calculating, using the determined grating color value, a grating ink amount which is an ink amount of the grating point in the array, and an interpolation calculation step of calculating an ink amount of the pixel group determined to form the gradation by interpolation using the calculated grating ink amount.

BRIEF DESCRIPTION OF THE DRAWINGS

FIG. 8 is a schematic diagram showing an example of pixel values constituting a pixel group of a gradation region.

FIG. 9 is a schematic diagram showing a color conversion table of grating color values and grating ink amounts of the pixel groups constituting the gradation region.

DESCRIPTION OF EXEMPLARY EMBODIMENTS

A. First Embodiment

Figure 1:
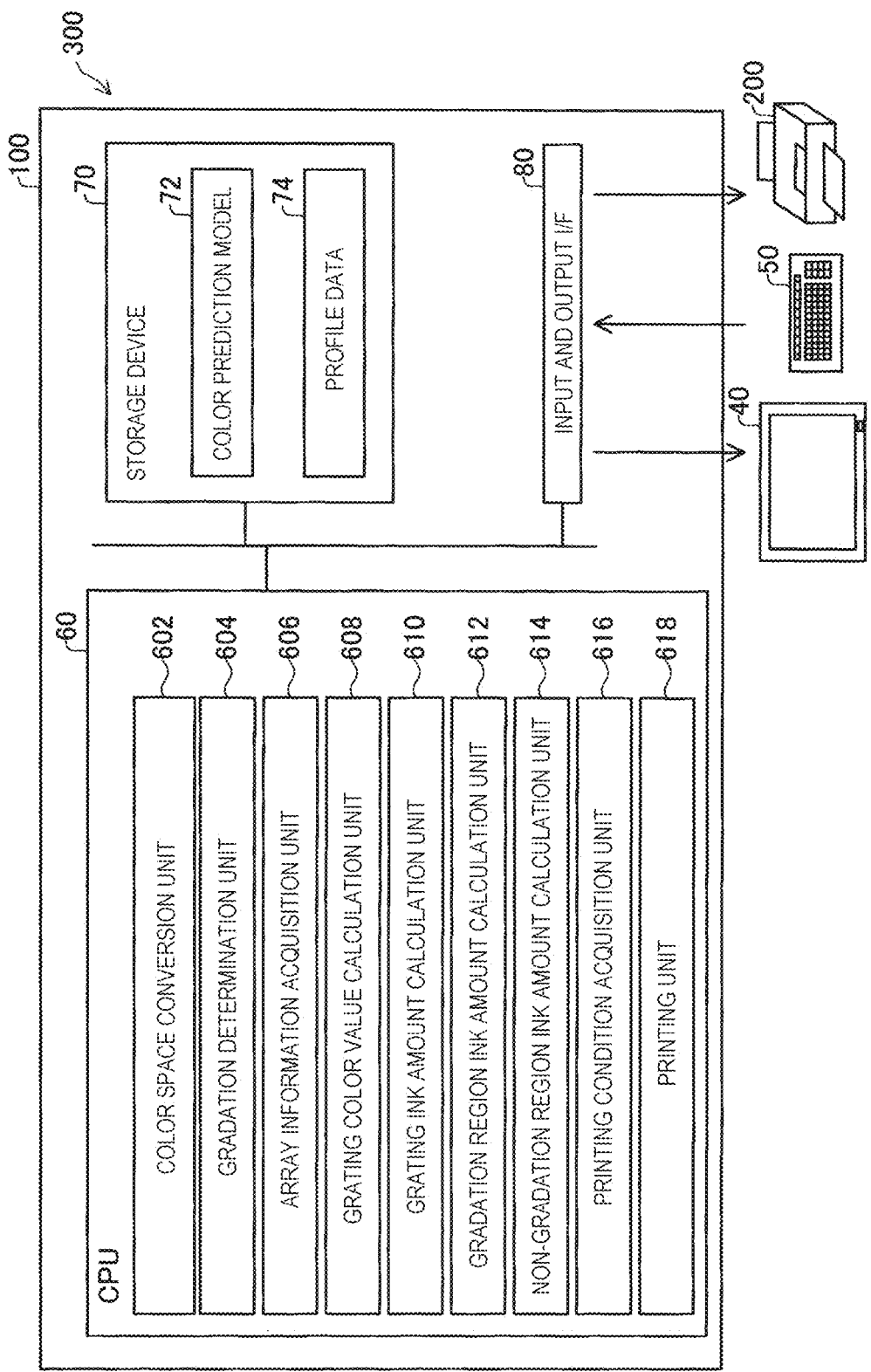
FIG. 1 is a block diagram showing a configuration of a printing system according to a first embodiment of the present disclosure.

FIG. 1 is a block diagram showing a configuration of a printing system 300 according to a first embodiment of the present disclosure. The printing system 300 includes an image analysis apparatus 100 and a printer 200. The image analysis apparatus 100 analyzes image data and acquires used ink information indicating ink types used for printing and an ink amount for each ink type. The "image data" includes a plurality of pixels, and is, for example, dot matrix data in which each color component of a device-dependent color space such as an RGB color space is expressed in gradation and a color of each pixel is defined. In the embodiment, a pixel value of each pixel of the image data has 256 gradations for each color, and is data adopting a color specification system according to a sRGB standard. The image analysis apparatus 100 determines presence or absence of a gradation region including a pixel group that forms a gradation, and calculates the ink amount by a different method depending on whether the region is the gradation region. The image data is not limited to RGB data, and various types of data such as JPEG image data adopting a YCbCr color specification system and data adopting a CMYK color specification system can be adopted.

The image analysis apparatus 100 is, for example, a computer, and includes a CPU 60, a storage device 70, and an input and output I/F 80. The CPU 60, the storage device 70, and the input and output I/F 80 are coupled via an internal bus so as to be capable of bidirectionally performing communication. An operation input device 50 such as a keyboard or a mouse, a display 40 for screen display, and the printer 200 are coupled to the image analysis apparatus 100 via the input and output I/F 80.

The CPU 60 functions as a color space conversion unit 602, a gradation determination unit 604, an array information acquisition unit 606, a grating color value calculation unit 608, a grating ink amount calculation unit 610, a gradation region ink amount calculation unit 612, a non-gradation region ink amount calculation unit 614, a printing condition acquisition unit 616, and a printing unit 618 by executing a control program stored in advance in the storage device 70. The color space conversion unit 602 converts a color space of image data from a device-dependent color space, such as the RGB color space, to the uniform color space. The "uniform color space" means a color solid in which distances between colors that appear to be the same color difference are equal when the colors are viewed. In the embodiment, "L*a*b* space" is used as the "uniform color space". In the following description, for convenience of description, L*a*b* as an image color value may be simply referred to as "Lab". An LCH space, a LUV space, or the like may be used as the uniform color space.

The gradation determination unit 604 determines whether a pixel group forms a gradation, that is, the presence or absence of the gradation region, by using a distribution of the pixel group and a color change included in a predetermined range from a pixel of interest in the uniform color space. The array information acquisition unit 606 acquires whether pixels constituting the pixel group determined to form the gradation are arranged linearly, in a planar manner, or in a polyhedron manner in the uniform color space. The grating color value calculation unit 608 determines a grating color value which is a color value of a grating point in an array of the pixels of the pixel group determined to form the gradation. The grating ink amount calculation unit 610 converts the determined grating color value to calculate a grating ink amount which is an ink amount of the grating point. The gradation region ink amount calculation unit 612 calculates the ink amounts of the respective pixels of the pixel group determined to form the gradation. The non-gradation region ink amount calculation unit 614 calculates an ink amount of a pixel which is not determined to form the gradation using a color prediction model. The printing condition acquisition unit 616 acquires printing conditions specified by a user. The printing unit 618 drives the printer 200 to print the image data.

The storage device 70 includes a ROM, a RAM, and an EEPROM. The storage device 70 stores a color prediction model 72 and profile data 74 in addition to various programs for implementing functions provided in the embodiment. The profile data 74 is a profile for converting the RGB data into the image color value. In the embodiment, the profile data 74 converts the sRGB color space into the L*a*b* color space. The color prediction model 72 acquires a predicted value of a spectral reflection factor of a printed matter when printing is performed under the printing conditions such as a combination of the ink amounts of the ink types used in the printer 200, a printing mode set in the printer 200 such as printing image quality and a printing speed, and a printing medium used for the printing. The color prediction model 72 can set a standard light source under observation conditions such as CIE standard light D50, convert the acquired spectral reflection factor into the image color value (L*a*b*), and convert the converted image color value into ink amount data for reproducing the image color value. The color prediction model 72 can be created by, for example, actually printing a color chart for a plurality of representative points in an ink amount space represented by a color specification system of ink colors, acquiring a spectral reflection factor of the color chart, and performing learning according to a neural network from a correspondence between an ink amount set and the spectral reflection factor as training data.

The printer 200 has a mechanism in which ink cartridges filled with ink having a plurality of colors can be attached and detached for each color. In addition to cyan (C), magenta (M), yellow (Y), and black (K), which are general ink types, special color ink cartridges such as red (Rd), orange (Or), green (Gr), and light black (Lk) are mounted on the printer 200. Ink types such as blue (Bl), violet (Vi), fluorescent yellow (FY), fluorescent magenta (FM), light cyan (Lc), and light magenta (Lm) may be further mounted. Lk is an achromatic color having a lower density than K, Lc is cyan having a lower density than C, and Lm is magenta having a lower density than M. The printer 200 is capable of ejecting ink from nozzles formed on the carriage while performing main scanning of the carriage and sub-scanning with a paper feed roller, and forms a large number of colors by combining the ink types, thereby forming a color image on a printing medium. In the embodiment, the printer 200 is an ink jet printer, but various printers such as a laser printer other than the ink jet printer can also be adopted.

Figure 2:
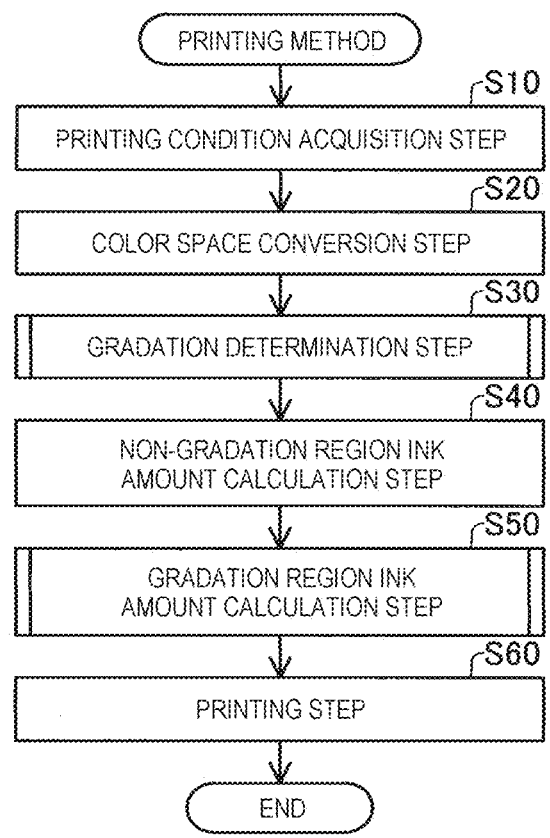
FIG. 2 is a flowchart showing a printing method according to the embodiment.

FIG. 2 is a flowchart showing a printing method according to the embodiment. This flow is started, for example, when the image analysis apparatus 100 or the printer 200 receives an operation of executing print processing of the image data. In a printing condition acquisition step of step S10, the printing condition acquisition unit 616 acquires the printing condition input by, for example, the user using the operation input device 50. The printing conditions include, for example, the printing mode set in the printer 200, information on the printing medium, the ink type permitted to be used, and a duty limit value of the ink type. As the printing medium, in addition to various paper media such as photographic paper and plain paper, any type of medium such as a resin film and cloth can be set. The "duty limit value" means an upper limit value of a total amount of ink that can be ejected per unit area of the printing medium. By providing the duty limit value, it is possible to reduce or prevent a failure such as ink bleeding caused by excessive ink ejected per unit area by the ink jet printer. As the duty limit value, a duty limit value based on a sum of a plurality of colors can be specified in addition to a duty limit value based on a single color. For example, it is possible to set the ink amount from 0% to 100% as the duty limit value based on the single color, the ink amount from 0% to 200% as the duty limit value based on a combination of 2 colors of ink, and the ink amount from 0% to the ink type×100% as a total duty limit value based on a combination of any number of colors of ink other than the single color and the 2 colors of ink.

In a color space conversion step of step S20, the color space conversion unit 602 converts the color space of the image data from the device-dependent color space to the uniform color space. Specifically, the color space conversion unit 602 converts the color space of the image data from the device-dependent color space to the uniform color space using the profile data 74 to calculate the image color value (L*a*b*). In step S30, the gradation determination unit 604 uses a distribution of a pixel group and a color change included in a predetermined range from one pixel of interest in the converted uniform color space to determine whether the pixel group forms a gradation. In step S40, the non-gradation region ink amount calculation unit 614 uses the color prediction model 72 to calculate an ink amount of each pixel of a non-gradation region constituted by pixels that are not determined to form the gradation.

In step S50, the gradation region ink amount calculation unit 612 calculates the ink amounts of the respective pixels of the pixel group determined to form the gradation, that is, the pixel group included in the gradation region by the gradation determination unit 604. In step S60, the printing unit 618 drives the printer 200 to print the image data by integrating the used ink information indicating the ink type to be used for printing and the ink amount for each ink type calculated for each of the non-gradation region and the gradation region.

Figure 3:
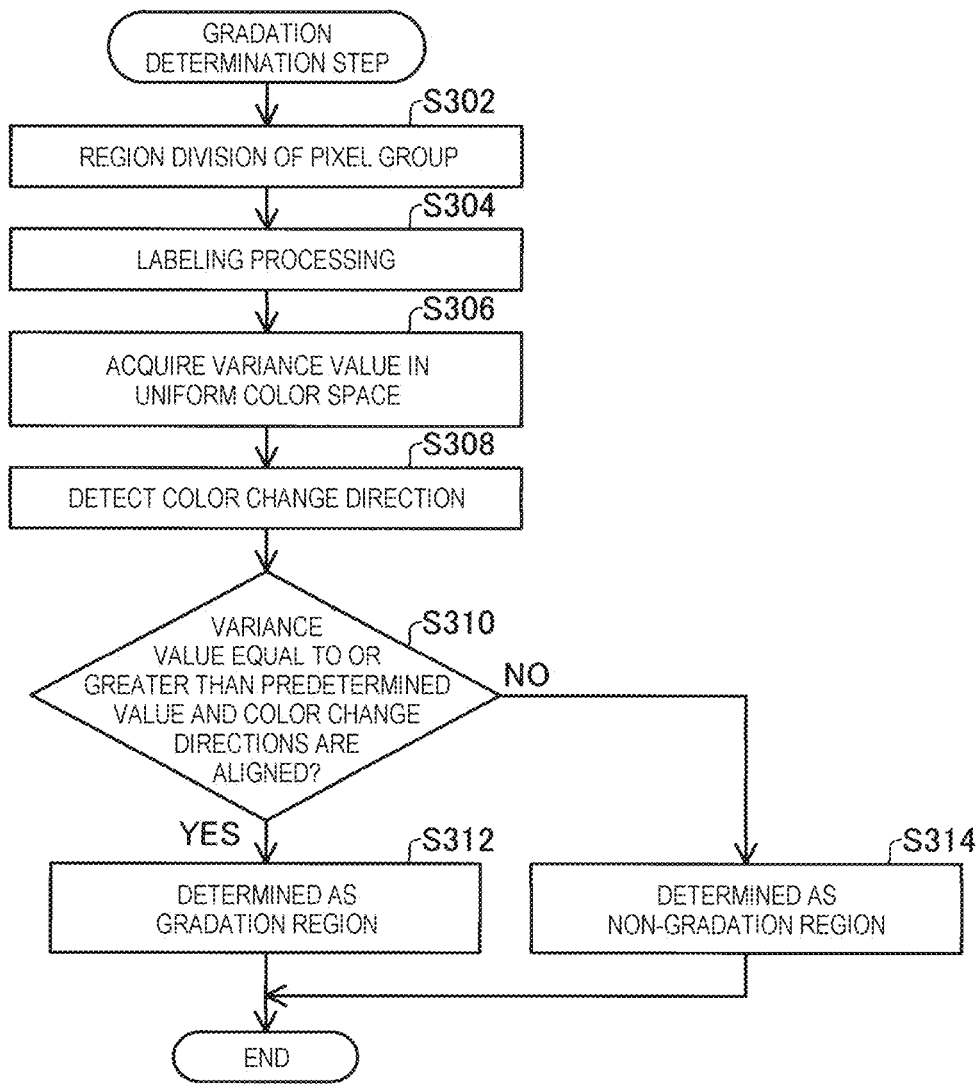
FIG. 3 is a flowchart showing details of a gradation determination step.

FIG. 3 is a flowchart showing details of the gradation determination step. In step S302, the gradation determination unit 604 obtains a plurality of unit regions by equally dividing the uniform color space. For example, the gradation determination unit 604 divides a Lab space at predetermined intervals along an L-axis direction, an a-axis direction, and a b-axis direction, thereby acquiring a plurality of unit regions in a color space having a constant brightness. Identification codes can be assigned to the acquired unit regions. The gradation determination unit 604 detects a pixel for each of the acquired unit regions and acquires, for each of the unit regions, coordinates of the pixel represented in the unit region in an image space. The gradation determination unit 604 groups the pixels based on a predetermined search range from the coordinates of the acquired pixels in the image space. Specifically, the gradation determination unit 604 represents the image space on a secondary plane including an X axis and a Y axis, and searches for other pixels existing in the predetermined search range from coordinates of one pixel of interest. When other pixels are detected in the search range, the pixels are associated with pixels belonging to one group.

In step S304, the gradation determination unit 604 performs labeling processing on each pixel based on a color value in the uniform color space and a coordinate value in the image space. In the labeling processing, the gradation determination unit 604 assigns an identification code to each of pixels belonging to a predetermined range of a color value from the pixel of interest in the uniform color space and having adjacent coordinate values in the image space.

In step S306, the gradation determination unit 604 measures, for each divided region subjected to the labeling processing, a variance value of pixels belonging to the divided region in the uniform color space. When the obtained variance value is equal to or greater than a predetermined value, there is variation within a range of the unit region in the uniform color space, and presence of the gradation related to hue or color can be positively estimated.

In step S308, the gradation determination unit 604 detects a color change direction of the pixels in each divided region. The gradation determination unit 604 can detect the color change direction using a density difference, a color difference, or the like between adjacent pixels. For example, in a case of a linear gradation, since the color change directions of adjacent pixels coincide with each other, an angle between the mutual color change directions is about 0 degrees. In a case of a radial gradation, the color change directions of the pixels converge on an identified point or diverge from the identified point, and thus the color change directions of the adjacent pixels show the same tendency as long as the color change directions of the adjacent pixels do not exceed a predetermined angle such as 45 degrees. In this case, the gradation determination unit 604 detects an angle of the change direction of the color value by using a characteristic extraction filter such as a Sobel filter, so that the radial gradation can be detected.

When the color change direction is detected, the gradation determination unit 604 groups the gradations. Specifically, the gradation determination unit 604 obtains a color change vector for each divided region, and sets the divided regions in the same gradation group when directions of the color change vectors of the adjacent divided regions are within a predetermined range. The color change vector can be expressed by a color change direction and a color change amount. The "color change direction" indicates a color change of the pixels in the image space, and the "color change amount" can be acquired by obtaining a color difference between pixels in the uniform color space and obtaining an average of the color differences for each divided region. For example, it is possible to obtain an inner product for two color change vectors and determine whether the directions are aligned based on the obtained inner product. When an obtained inner product value is less than a predetermined value, it can be determined that the color change directions are not aligned, and when the inner product value is equal to or greater than the predetermined value, it can be determined that the color change directions are aligned.

In step S310, the gradation determination unit 604 determines whether a region is the gradation region based on whether the variance value obtained in step S306 is equal to or greater than a predetermined value and the color change directions detected in step S308 are aligned. When the variance value is equal to or greater than the predetermined value and the color change directions are aligned (S310: YES), the process proceeds to step S312, and it is determined that the pixel group forms the gradation and belongs to the gradation region. When the variance value is less than the predetermined value or the color change directions are not aligned (S310: NO), the process proceeds to step S314, and it is determined that the pixel group belongs to the non-gradation region without forming the gradation.

Figure 4:
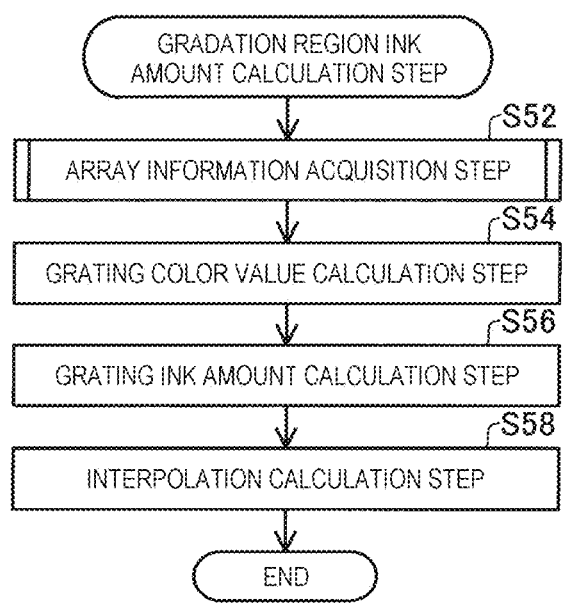
FIG. 4 is a flowchart showing details of a gradation region ink amount calculation step.

FIG. 4 is a flowchart showing details of a gradation region ink amount calculation step. In the array information acquisition step of step S52, the array information acquisition unit 606 acquires whether pixel values constituting the pixel group determined to form the gradation are arranged based on geometric information of a straight line, a plane, or a polyhedron in the uniform color space. In the grating color value calculation step of step S54, the grating color value calculation unit 608 determines a grating color value which is the color value of the grating point located on an outer edge of the acquired array. When the array of the pixel groups belonging to the gradation region is linear, the grating point means an end point at both ends thereof. In the grating ink amount calculation step of step 56, the grating ink amount calculation unit 610 uses the determined grating color value to calculate a grating ink amount which is an ink amount of the grating point. In step S58, the grating ink amount calculation unit 610 calculates an ink amount of pixels included in a space surrounded by the grating points in the pixel group included in the gradation region by interpolation calculation using the calculated grating ink amount.

Figure 5:
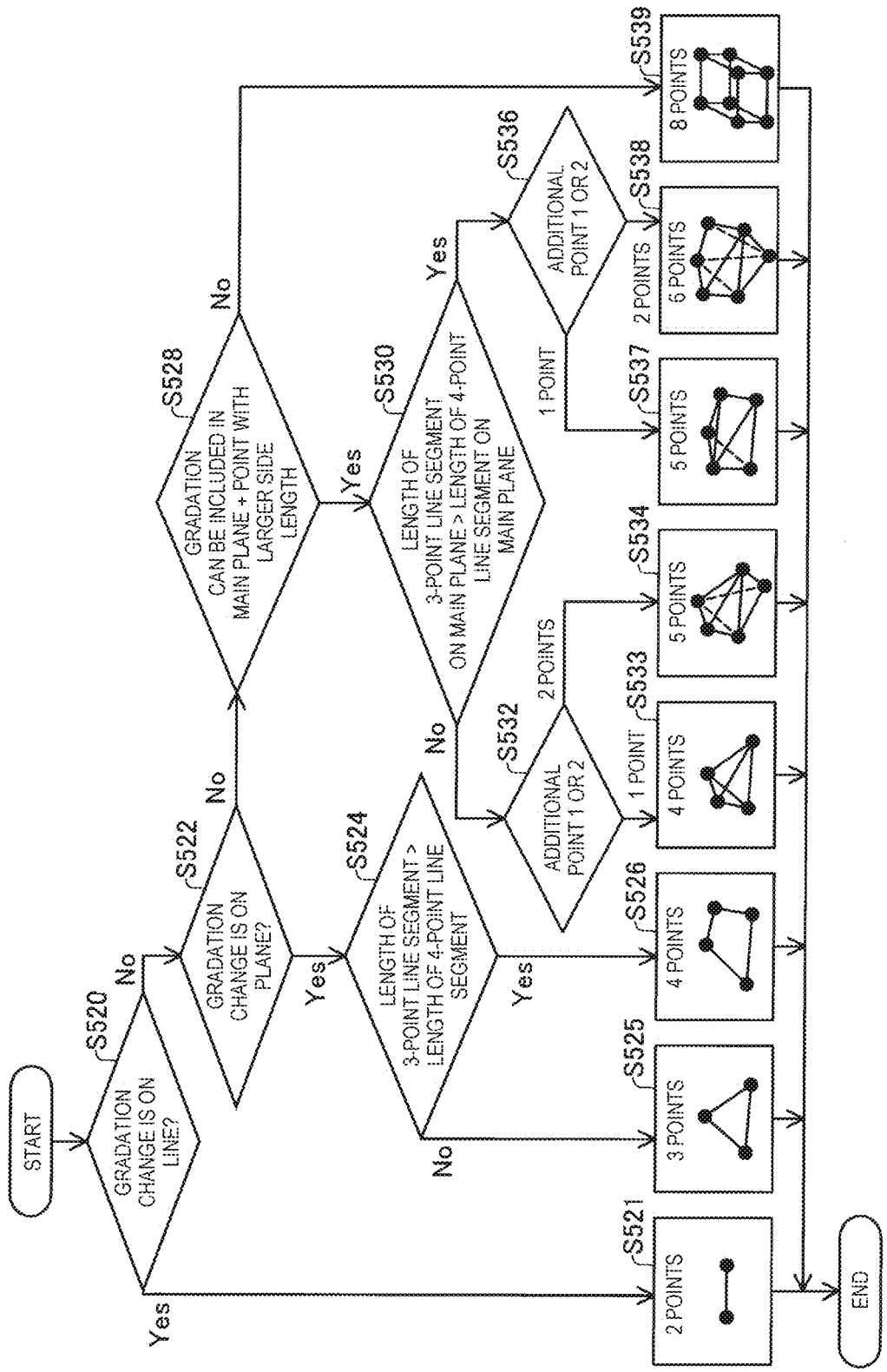
FIG. 5 is a schematic diagram showing details of an array information acquisition step.

FIG. 5 is a schematic diagram showing details of an array information acquisition step. In the array information acquisition step, the array information acquisition unit 606 identifies in which range in the uniform color space the pixel group determined to form the gradation is present. In step S520, it is determined whether the pixel groups are linearly arranged in the uniform color space using the image color values of the pixels of the pixel group determined to form the gradation. When the pixel groups are linearly arranged (S520: YES), the process proceeds to step S521, and two pixels located at both ends of a straight line are determined as the grating points. When the pixel groups are not linearly arranged (S520: NO), the process proceeds to step S522, and the array information acquisition unit 606 confirms whether the image color values of the pixel groups are arranged in a planar manner. When the pixel groups are arranged in the planar manner (yes at step S522), the process proceeds to step S524, and it is determined whether a length of a 3-point line segment among pixels included in the pixel group is greater than a length of a 4-point line segment among pixels included in the pixel group. When the length of the 3-point line segment is equal to or less than the length of the 4-point line segment (S524: NO), the process proceeds to step S525, and the pixels of the 3-point line segment are determined as the grating points. When the length of the 3-point line segment is greater than the length of the 4-point line segment (S524: YES), the process proceeds to step S526, and the pixels of the 4-point line segment are determined as the grating points.

When the pixel groups are not arranged in the planar manner (S522: NO), the process proceeds to step S528. In step S528, the array information acquisition unit 606 confirms whether all pixel groups can be included in the space surrounded by the plane formed by a part of pixels included in the pixel group and other pixels having a vertex with a largest side length. When all the pixel groups can be included in the space (S528: YES), the array information acquisition unit 606 proceeds to step S530. When all the pixel groups cannot be included in the space (S528: NO), the process proceeds to step S539, and the array information acquisition unit 606 determines that pixels at 8 points on the outer edge are the grating points.

In step S530, when the length of the 3-point line segment on a plane formed by the part of pixels included in the pixel group is equal to or less than the length of the 4-point line segment on the plane (S530: NO), the process proceeds to step S532, and the pixels that are added to the plane by the 3 points on the outer edge are confirmed. When the number of additional points is 1 (S532: 1 point), the process proceeds to step S533, and a total of 4 points, 3 points located on the outer edge of the plane and 1 additional point are determined as the grating points. When the number of additional points is 2 (S532: 2 points), the process proceeds to step S534, and a total of 5 points, 3 points located on the outer edge of the plane and 2 additional points are determined as the grating points.

In step S530, when the length of the 3-point line segment on the plane is greater than the length of the 4-point line segment (S530: YES), the process proceeds to step S536, and the pixels that are added to the plane by the 4 points on the outer edge are confirmed. When the number of additional points is 1 (S536: 1 point), the process proceeds to step S537, and a total of 5 points, 4 points located on the outer edge of the plane and 1 additional point are determined as the grating points. When the number of additional points is 2 (S536: 2 points), the process proceeds to step S538, and a total of 6 points, 4 points located on the outer edge of the plane and 2 additional points are determined as the grating points.

Figure 6:
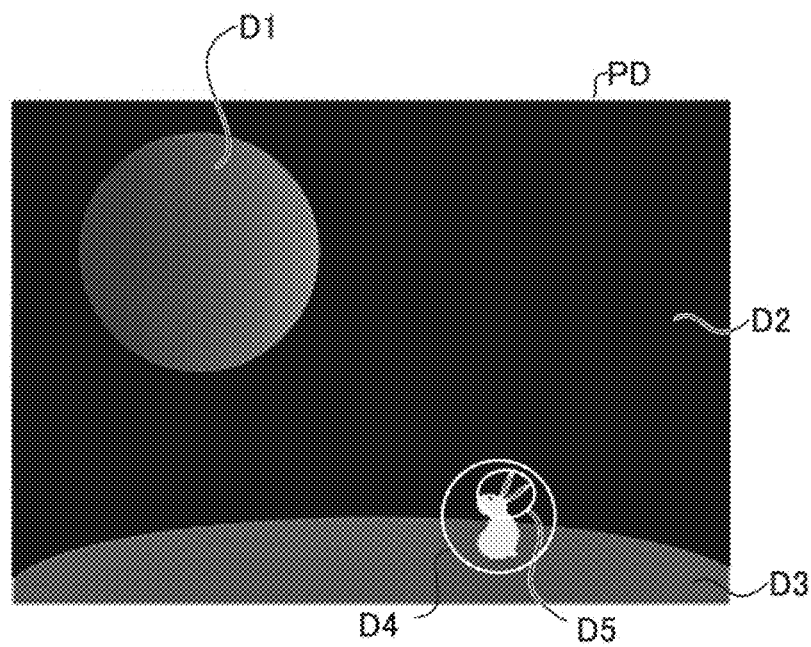
FIG. 6 is a schematic diagram showing an example of image data.

The printing method according to the embodiment will be described in detail with reference to FIGS. 6 to 9. FIG. 6 is a schematic diagram showing an example of the image data. Image data PD shown in FIG. 6 includes a gradation region D1 and non-gradation regions D2 to D5.

Figure 7:
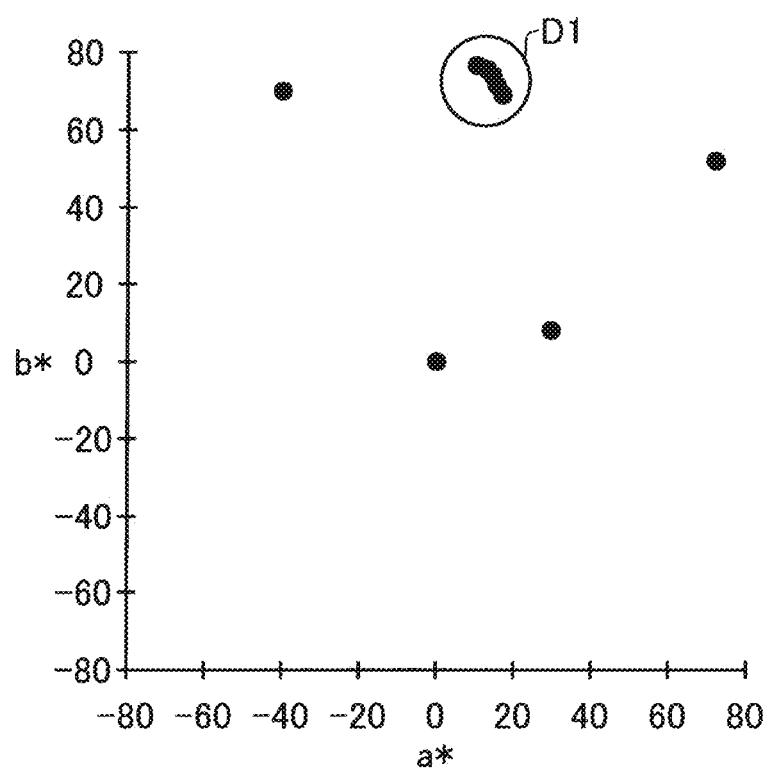
FIG. 7 is a schematic diagram schematically showing a uniform color space.

FIG. 7 is a schematic diagram schematically showing the uniform color space. In FIG. 7, a 2-dimensional color space of b* values and a* values is shown in order to facilitate understanding of the technique, but the 2-dimensional color space is actually a 3-dimensional color space of L*a*b*. A pixel group surrounded by a solid line in FIG. 7 is a pixel group constituting the gradation region D1 of the image data PD shown in FIG. 6. The other 4 pixels shown in FIG. 7 are pixels corresponding to image color values of the non-gradation regions D2 to D5 of the image data PD. The non-gradation region ink amount calculation unit 614 uses the color prediction model 72 and image color values of the pixels of the non-gradation regions D2 to D5, so as to calculate an ink amount for reproducing a spectral reflection factor of an image indicated by the input image color values.

FIG. 8 is a schematic diagram showing an example of pixel values constituting the pixel group of the gradation region D1. In an example of a table TB1 of FIG. 8, in the pixel values of the pixel group of the gradation region D1, a minimum value of L* values is 75, a maximum value thereof is 80, a minimum value of the a* values is 10, a maximum value thereof is 20, a minimum value of the b* values is 70, and a maximum value thereof is 80. The array information acquisition unit 606 uses the maximum value and the minimum value of the image color values of the gradation region D1 to determine whether the pixel groups constituting the gradation region D1 are arranged linearly, in a planar manner, or in a polyhedral manner in the uniform color space. In the embodiment, the pixel group of the gradation region D1 cannot include all the pixel groups in a space surrounded by a plane formed by a part of pixels included in the pixel group and other pixels having a vertex with a largest side length, and the array information acquisition unit 606 determines that pixels at 8 points on an outer edge are grating points. The grating color value calculation unit 608 sets 8 points, which are combinations of the minimum values and the maximum values of the L* value, the a* value, and the b* value shown in FIG. 8, as the grating points, and sets the image color value of each grating point as a grating color value.

FIG. 9 is a schematic diagram showing a color conversion table of grating color values and grating ink amounts of the pixel groups constituting the gradation region D1. A table TB2 shown in FIG. 9 defines, for each grating point, a correspondence between the image color value in the uniform color space under a reference light source and a usage amount of each ink type. The grating ink amount corresponding to each grating color value of the table TB2 is calculated using the color prediction model 72 by the grating ink amount calculation unit 610 according to printing conditions, such as printing medium information set by the user, ink types permitted to be used, and the duty limit value of the ink type. Among the pixel groups included in the gradation region D1, the ink amount of the pixels other than the pixels forming the grid points, more specifically, the pixels included in a space of the polyhedron formed by the 8 grating points of Table TB2 is calculated by the gradation region ink amount calculation unit 612 performing the interpolation calculation, instead of using the color conversion table.

As described above, according to the printing method of the embodiment, the gradation region ink amount calculating step includes an array information acquisition step of acquiring whether pixel values constituting the pixel group determined to form the gradation are arranged linearly, in a planar manner, or in a polyhedral manner in the uniform color space, a grating color value calculation step of determining a grating color value which is a color value of a grating point in the array, a grating ink amount calculation step of calculating, using the determined grating color value, a grating ink amount which is an ink amount of the grating point in the array, and an interpolation calculation step of calculating an ink amount of the pixel group determined to form the gradation by interpolation using the calculated grating ink amount. According to the printing method of the embodiment, it is possible to extract the pixel group included in the gradation region D1 and express a continuous color change by matching a change in ink amount of pixels in the gradation region with a change in image color value. Accordingly, as compared with a case where the pixels of the pixel group of the gradation region D1 are individually converted from the image color value to the ink amount, a part of the color values having the gradation can be sufficiently reproduced, and an image having high gradation can be formed. In addition, by extracting the grating points including the pixel group constituting the gradation region D1 and performing the interpolation calculation, it is possible to reduce a load on the calculation of the ink amount.

The printing method according to the embodiment further includes a non-gradation region ink amount calculation step. In the non-gradation region ink amount calculation step, the ink amounts of the pixels different from those of the pixel group determined to form the gradation, that is, the pixels of the non-gradation regions D2 to D5 are individually calculated for each pixel using the color prediction model. Accordingly, color reproducibility of the non-gradation regions D2 to D5 of a print image can be improved.

According to the printing method of the embodiment, the grating ink amount calculation step calculates the grating ink amount using the color prediction model 72. By using the color prediction model 72, after a standard light source under observation conditions is set, the acquired spectral reflection factor is converted into the image color value ($L^*a^*b^*$), so that it is possible to convert the converted image color value into ink amount data for reproduction, and the color reproducibility of the print image can be improved.

The printing method according to the embodiment further includes a printing condition acquisition step of acquiring a print condition of the image data, and the grating ink amount calculation step calculates an ink amount in accordance with the acquired printing condition. According to the printing method of the embodiment, the image data can be printed with an ink amount suitable for the printing condition desired by the user.

In the printing method according to the embodiment, the printing condition includes at least one of a type of ink to be used and a type of a printing medium. According to the printing method of the embodiment, the image data can be printed with an ink amount suitable for the type of ink and the printing medium desired by the user.

B. Other Embodiments (B1) In the above embodiment, an example in which the variance value is used when it is determined whether the gradation is formed is described. On the other hand, it may be determined whether a gradation is formed by segmentation of a point group into clusters using a minimum Euclidean distance between points of different clusters, or it may be determined whether a gradation is formed by a method other than the method using the variance value.

C. Other Embodiments

The present disclosure is not limited to the embodiments described above, and can be implemented in various forms without departing from the scope of the present disclosure. For example, in order to solve a part or all of problems described above, or to achieve a part or all of effects described above, technical characteristics in the embodiment corresponding to the technical characteristics in each embodiment described in the summary of the disclosure can be replaced or combined appropriately. In addition, when the technical characteristics are not described as necessary in the present description, the technical characteristics can be appropriately deleted.

(1) According to an aspect of the present disclosure, a printing method is provided. The printing method includes: a color space conversion step of converting a color space of image data from a device-dependent color space to a uniform color space; a gradation determination step of determining, using a distribution of a pixel group and a color change included in a predetermined range from a pixel of interest in the converted uniform color space, whether the pixel group forms a gradation; and a gradation region ink amount calculation step of calculating an ink amount of the pixel group determined to form the gradation, in which the gradation region ink amount calculation step includes an array information acquisition step of acquiring whether pixel values constituting the pixel group determined to form the gradation are arranged linearly, in a planar manner, or in a polyhedral manner in the uniform color space, a grating color value calculation step of determining a grating color value which is a color value of a grating point in the array, a grating ink amount calculation step of calculating, using the determined grating color value, a grating ink amount which is an ink amount of the grating point in the array, and an interpolation calculation step of calculating an ink amount of the pixel group determined to form the gradation by interpolation using the calculated grating ink amount.

According to the printing method of the aspect, as compared with a case where the pixels of the pixel group determined to form the gradation are individually converted from the image color value to the ink amount, an image having high gradation can be formed.

(2) The printing method according to the above aspect may further include a non-gradation region ink amount calculation step of calculating, using a color prediction model, an ink amount of a pixel which is not determined to form the gradation.

According to the printing method of the aspect, the color reproducibility of the non-gradation region of the print image can be improved by individually calculating the ink amounts of the pixels of the non-gradation region using the color prediction model.

(3) In the printing method according to the above aspect, the grating ink amount calculation step may calculate the grating ink amount using a color prediction model.

According to the printing method of the aspect, the color reproducibility of the print image can be improved.

(4) The printing method according to the above aspect may further include a printing condition acquisition step of acquiring a print condition of the image data. The grating ink amount calculation step may calculate an ink amount in accordance with the acquired printing condition.

According to the printing method of the aspect, the image data can be printed with an ink amount suitable for the printing condition desired by the user.

(5) In the printing method according to the above aspect, the printing condition may include at least one of a type of ink to be used and a type of a printing medium.

According to the printing method of the aspect, the image data can be printed with an ink amount suitable for the type of ink and the printing medium desired by the user.

The present disclosure can also be implemented in various aspects other than the printing method. For example, the present disclosure can be implemented in aspects of a printing apparatus, an image analysis apparatus, a printing system including the printing apparatus and the image analysis apparatus, a method of manufacturing the printing apparatus, a method of controlling the printing apparatus, a computer program for implementing the method of controlling the printing apparatus, a non-transitory recording medium on which the computer program is recorded, or the like.

What is claimed is:

1. A printing method comprising:
a color space conversion step of converting a color space of image data from a device-dependent color space to a uniform color space;
a gradation determination step of determining, using a distribution of a pixel group and a color change included in a predetermined range from a pixel of interest in the converted uniform color space, whether the pixel group forms a gradation; and
a gradation region ink amount calculation step of calculating an ink amount of the pixel group determined to form the gradation, wherein
the gradation region ink amount calculation step includes
an array information acquisition step of acquiring whether pixel values constituting the pixel group determined to form the gradation are arranged linearly, in a planar manner, or in a polyhedron manner in the uniform color space,
a grating color value calculation step of determining a grating color value which is a color value of a grating point in the array,
a grating ink amount calculation step of calculating, using the determined grating color value, a grating ink amount which is an ink amount of the grating point in the array, and
an interpolation calculation step of calculating an ink amount of the pixel group determined to form the gradation by interpolation using the calculated grating ink amount.

2. The printing method according to claim 1, further comprising:
a non-gradation region ink amount calculation step of calculating, using a color prediction model, an ink amount of a pixel which is not determined to form the gradation.

3. The printing method according to claim 1, wherein the grating ink amount calculation step calculates the grating ink amount using a color prediction model.

4. The printing method according to claim 1, further comprising:
a printing condition acquisition step of acquiring a printing condition of the image data, wherein
the grating ink amount calculation step calculates an ink amount in accordance with the acquired printing condition.

5. The printing method according to claim 4, wherein the printing condition includes at least one of a type of ink to be used and a type of a printing medium.

* * * * *